United States Patent [19]
Wilkins

[11] 4,114,711
[45] Sep. 19, 1978

[54] FLOOR TREATING MACHINES

[75] Inventor: John Thomas Wilkins, Bushey Heath, England

[73] Assignee: R. G. Dixon & Company Limited, Wembley, England

[21] Appl. No.: 833,727

[22] Filed: Sep. 16, 1977

Related U.S. Application Data

[63] Continuation-in-part of Ser. No. 647,719, Jan. 9, 1976, abandoned.

[30] Foreign Application Priority Data

Jan. 10, 1975 [GB] United Kingdom ............... 1154/75

[51] Int. Cl.² ............................................. B62D 11/04
[52] U.S. Cl. ..................................... 180/6.5; 15/319; 180/98
[58] Field of Search ................ 15/1.7, 50 R, 319, 320; 180/6.5, 79.1, 98

[56] References Cited

U.S. PATENT DOCUMENTS

| | | | |
|---|---|---|---|
| 3,010,129 | 11/1961 | Moore | 15/319 X |
| 3,713,505 | 1/1973 | Muller | 15/319 X |
| 3,789,939 | 2/1974 | Geislinger | 180/79.1 X |

Primary Examiner—Christopher K. Moore
Attorney, Agent, or Firm—Barlow & Barlow

[57] ABSTRACT

A floor treating machine, particularly for scrubbing or polishing a floor is provided with a recording and replay device for the power supply to the traction motors so that it may be programmed to repeat a pattern of movement automatically. In order to provide constant and periodic checks on the accuracy of the repetition over long straight runs, there is provided a distance check device for comparing the distance run in operation with the distance run on recording, and means for correcting the path should discrepancies arise.

4 Claims, 5 Drawing Figures

FLOOR TREATING MACHINES

CROSS REFERENCE TO RELATED APPLICATION

This application is a continuation-in-part of my earlier filed application Ser. No. 647,719, filed Jan. 9, 1976, and now abandoned.

BACKGROUND OF THE INVENTION

This invention relates to floor treating machines and is an improvement in or modification of the invention forming the subject-matter of U.S. Pat. No. 3,952,361 dated April 27, 1976, hereinafter referred to as the prior patent.

The prior patent describes and claims a floor treating machine having laterally spaced drive wheels driven by separate electric traction motors under electronic control so as to be driven by separate trains of pulses, comprising means for recording the train of pulses to the traction motors, and means for replaying the record to reproduce the trains of pulses whereby the machine will repeat the operation.

The prior patent further describes and claims course correction devices comprising an overriding control means controlled by detectors for the presence of a wall or other obstructions in or adjacent the path of the machine, and further detectors differentiating between scrubbed and unscrubbed floor areas.

These devices are believed sufficient to ensure accuracy in negotiating complex parts of the course but it is now felt that greater accuracy may be necessary in dealing with long straight runs, since conditions may vary sufficiently for the same train of pulses not to bring the machine over the same distance on two different occasions.

SUMMARY OF THE INVENTION

According to the present invention, there is provided a floor treating machine as claimed in any one of the claims of the prior patent, comprising a distance check device for comparing the distance run in operation with the distance run on recording, and means for correcting the path should discrepancies arise.

The distance check may be a measuring wheel providing recordable pulses at intervals and also check pulses for comparison with the recorded pulses in operation. If a lead or lag develops, an overrider control will increase or decrease the power from each pulse to correct the discrepancy.

Alternatively, the distance check may be sensitive to fixed objects in the area being cleaned. For example the machine may carry a light source modulated at a specific frequency and photo-detectors sensitive to that frequency only (using say a phase-sensitive detector). Suitable reflectors may be arranged on the ceiling or walls of the space being cleaned so that pulses are provided by the photo-detector at predetermined points in the operation and the timing of these pulses may be compared with the pulses recorded during the initial recording operation to provide the distance check. For example, should the pulse obtained during automatic operation appear earlier than that recorded on the tape the machine would stop until the recorded pulse was produced. Should the recorded pulse appear first the tape would stop and the machine will continue under its own inertia without any current fed to the motors until the machine-generated pulse appeared.

DESCRIPTION OF THE PREFERRED EMBODIMENT

Figures 1, 2:
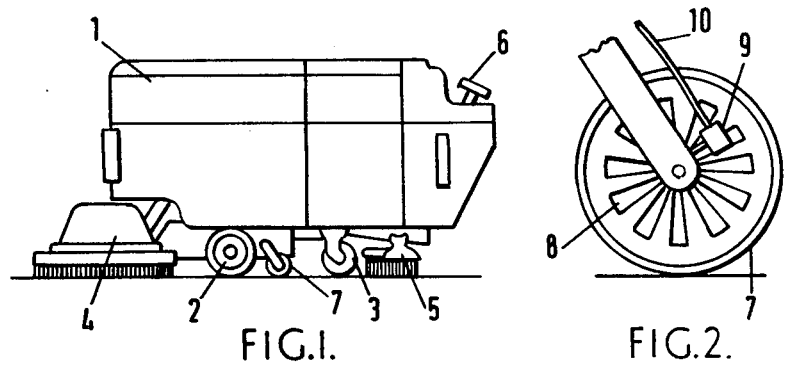
FIG. 1 is an elevation of a machine according to one embodiment of the invention.
FIG. 2 is an enlarged elevational view of a detail of FIG. 1.

The machine illustrated in FIG. 1 has a body 1 supported on forward drive wheels 2 and a rear caster wheel 3. A forward cleaning brush is shown at 4 and a rear suction or squeegee nozzle at 5. The machine is controlled initially by an operator walking behind and working a control device 6 for control of the power supply to separate motors for the two drive wheels 2. As described in the prior patent, the pulse trains to the motors are recorded so that the machine can theoretically repeat the same course. In order to provide some rechecking on the operation over long straight runs, the machine 1 according to one form of the present invention is provided with a measuring wheel 7, shown in greater detail in FIG. 2, which has projections 8 moving in succession past a magnetic proximity detector 9 which generates a pulse each time a projection 8 passes over it. These pulses are fed by a cable 9A to the control circuitry. In a recording mode the pulses are recorded simultaneously with the other data, and in an automatic operation mode, the pulses from the wheel 7 are checked against the pre-recorded pulses and the power to the motors is adjusted to keep them in synchronism.

Figure 3:
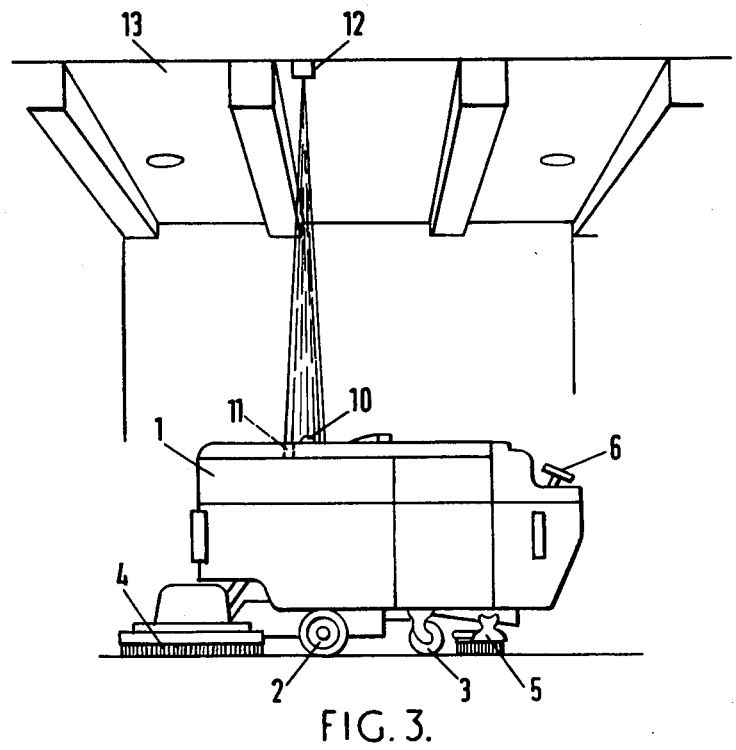
FIG. 3 is an elevation of a machine according to a different embodiment, shown in conjunction with a fixed reflector.

In the FIG. 3 embodiment of the invention, the machine is fitted, instead of or in addition to the measuring wheel 7, with a directional light source 10, modulated at a specific frequency, and a photo-cell or other photo-detector 11 to pick up reflected light signals emanating from the source 10 and reflected by strategically placed reflectors 12, shown here as in the celing 13 of an area to be cleaned. The reflectors constitute reference points marked by recording signals received by the photo-cell 11. In automatic operation, the signals from the photo-cell 11 would be compared with the recorded signals and the machine or tape stopped to bring them into synchronism should any measurable difference in the timing appear.

Figure 4:
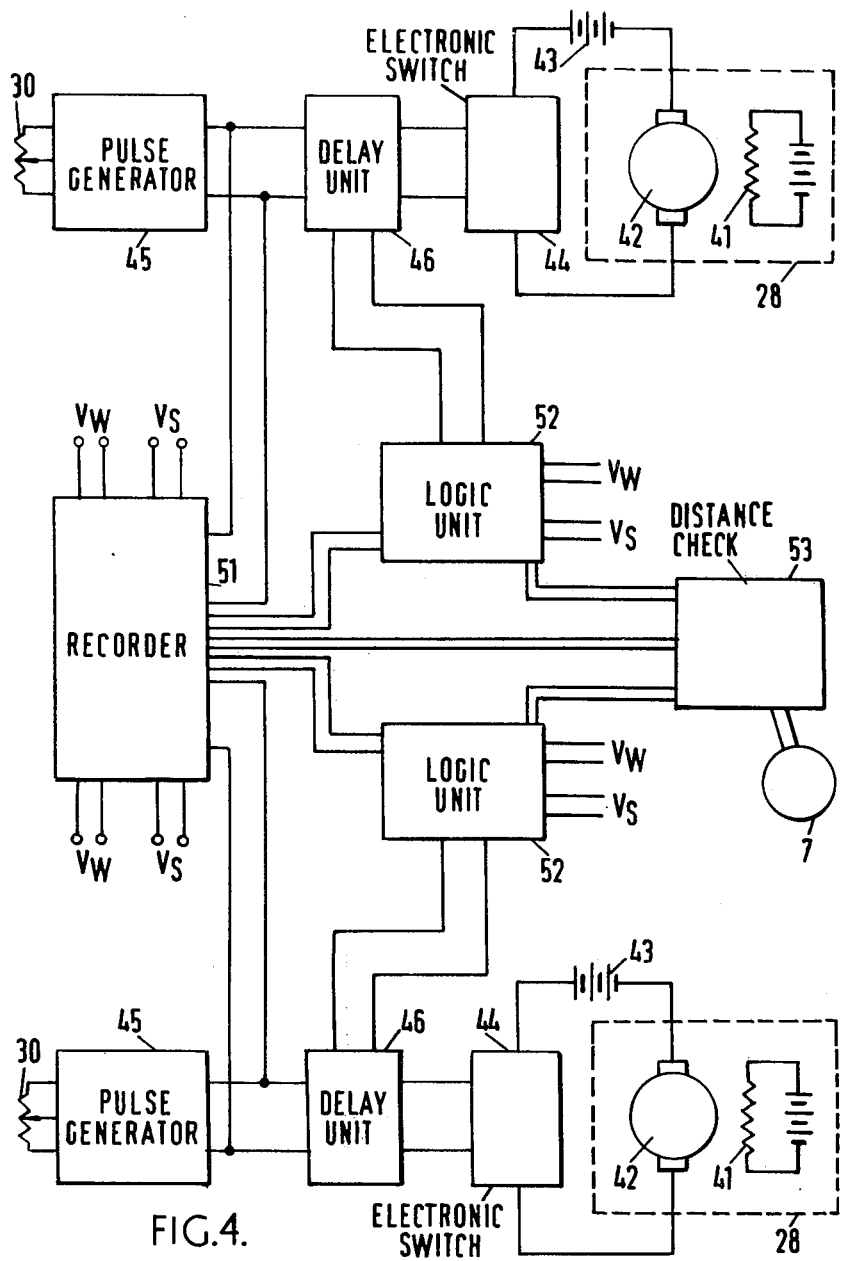
FIGS. 4 and 5 are circuit diagrams similar to those given in the prior patent but modified to include the distance check devices.
Figure 5:
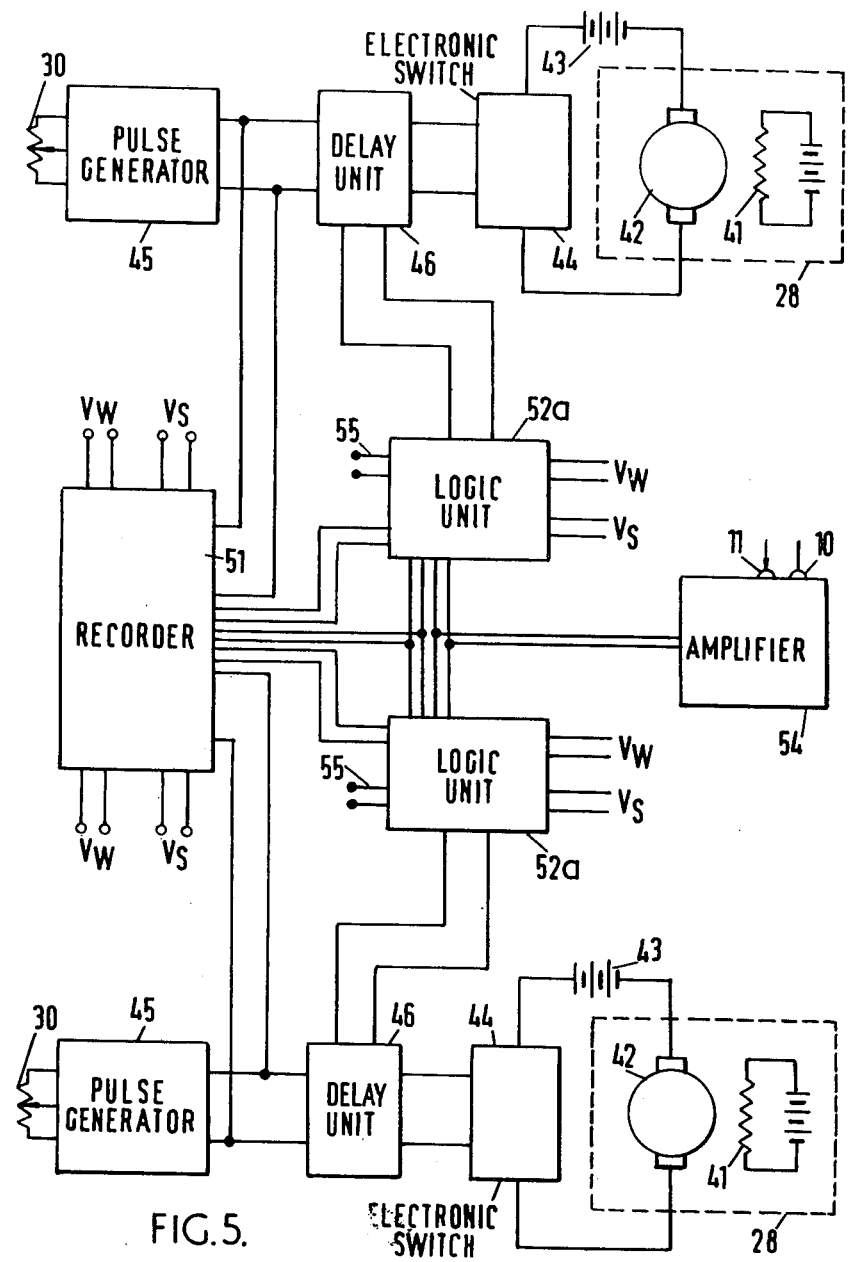

FIGS. 4 and 5 are largely similar to the circuit diagrams given in the prior patent and in each case shows control circuitry for the two motors 28, each of which is shown as having a field circuit 41 and an armature 42 which is energised from the battery 43 through an electronic switch 44 which would normally consist of a power transistor or a series of power transistors in parallel. The control for manual operation of the machine through the handle is derived from the potentiometers 30, the signals from which are fed to individual pulse generators 45 which produce rectangular voltage pulses at constant frequency and of a duration proportionate to the setting of the potentiometers 30. These pulses are fed through delay units 46 to the electronic switches 44 which thus produce a series of pulses corresponding to those produced by the pulse generators 45 as modified by the delay units 46.

In order to enable the machine to be operated automatically, once it has been operated manually, a multi-track tape recorder 51 records the outputs from the two pulse generators 45, and it can be seen that if these pulses are replayed from the recorder 51 and fed through the delay units 46 to the switches 44, the motors should repeat their operations and drive the treating machine on the same path as it followed in the manual control mode. However, because of slight operating differences that may occur, it is normally necessary to provide modification to the automatically produced path.

As in the prior patent, wall detectors and boundary detectors provide signals $V_w$ and $V_s$ to logic units 52 and the recorder 51.

The operation is essentially as described in the prior patent which is incorporated herein by reference.

In FIG. 4, a distance check logic unit 53 is shown as received signals in the form of pulses from the measuring wheel 7, and is connected to the recorder 51 and to the logic units or overrider control means 52 as disclosed in U.S. Pat. No. 3,952,361 at column 4, lines 3 to 56.

In the recording mode these pulses are fed directly to the tape recorder. In the play back mode when the machine is retracting its original path the pulses from the measuring wheel are compared in the distance check device 53 with the pulses recorded on the tape. If the pulses from the wheel are received at a higher rate than those from the tape the distance check device produces an output voltage which, via the logic units 52, retards the speed of both drive motors 28. Conversely if the pulses from the measuring wheel are slower than those from the recorder the drive motors 28 will be accelerated.

In FIG. 5 the signals from the source 10, reflected and received by the photo-cell 11 as amplified by an amplifier 54 and the amplified signals are passed to logic units 52a and thence to the recorder 51. The logic units 52a are generally similar to the units 52, but are modified to perform additional functions, as will appear. In the recording mode, these signals are recorded. In the play back mode the pulse received from the photo-cell 11 is compared, in the modified logic unit 52a, with the pulse produced from the tape. If the light pulse is received before the tape pulse, the machine is stopped until the tape pulse is produced. If the tape pulse is received before the light pulse the tape recorder is stopped via connector 55 until the light pulse is received. In practice, if the tape recorder is stopped, the electrical supply to the motors ceases to flow but the machine continues moving forward under its own inertia. If the system is working correctly, the positional error should be no more than a few inches. Hence, the effect of stopping the tape will be to cause the machine to lose speed slightly for a few inches until it gets under the marker light. At this point the tape will restart and the machine will commence movement on its correct course. If the navigational error is so large that the machine when free wheeling does not reach the marker light, then the machine will stop at this point. It is desirable that the machine should stop if it is subject to a large navigational error. If it continued there would be a danger of it picking up incorrect navigational information and of collision with other objects.

In the event of the error in either tape or distance check exceeding a preset amount the machine stops and operates an audible alarm.

Various modifications may be made within the scope of the invention. For instance, other forms of radiation may be used to carry out the distance check and the sources could be external to the machine.

I claim:

1. In a floor treating machine comprising laterally spaced drive wheels, separate traction motors drivably connected to the wheels and electronic control means to provide separate trains of pulses to operate the motors conjointly for straight line motion and differentially for steering motion, means for recording the trains of pulses to the traction motors for recording the path followed by the machine and means for replaying the record to reproduce the trains of pulses which are fed to the motors whereby the machine will reproduce the original path followed by the machine: the improvement of a distance check device for comparing the distance run in operation with the distance run during replaying of the record to see if path discrepancies exist, and overrider control means responsive to the output of the distance check comparison to sense a lag or lead and correspondingly increase or decrease the power fed to the motors to effect speed correction that will correct the path discrepancy.

2. A floor treating machine as claimed in claim 1, in which the distance check device includes a measuring wheel providing pulses at predetermined intervals to the recording means and independently to the overrider control means.

3. A floor treating machine as claimed in claim 2, in which said overrider control means increases or decreases the power supplied to drive the machine if a lag or lead occurs between the measuring wheel recorded pulses from the measuring wheel and the pulses emanating from the measuring wheel in automatic operation.

4. A floor treating machine as claimed in claim 1, provided with a light source and a photo-detector means sensitive to light from that source and reflected by reflectors strategically placed about the area to be treated, said photo-detector means providing a signal to the recording means and independently to the overrider control means whereby comparison of the signals may effect the drive of the machine.

* * * * *